(12) United States Patent
Tennant et al.

(10) Patent No.: US 9,863,805 B2
(45) Date of Patent: Jan. 9, 2018

(54) DETECTOR SYSTEMS HAVING STRAY LIGHT SUPPRESSION USING A RETRO-REFLECTOR SHIELD AND NEGATIVE LUMINESCENCE

(71) Applicant: Teledyne Scientific & Imaging, LLC, Thousand Oaks, CA (US)

(72) Inventors: William E. Tennant, Thousand Oaks, CA (US); Robert F. Buzerak, Santa Barbara, CA (US); David J. Gulbransen, Thousand Oaks, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 224 days.

(21) Appl. No.: 14/841,380

(22) Filed: Aug. 31, 2015

(65) Prior Publication Data
US 2017/0059398 A1    Mar. 2, 2017

(51) Int. Cl.
*G01J 1/06*    (2006.01)
*G01J 1/04*    (2006.01)
(Continued)

(52) U.S. Cl.
CPC .............. *G01J 1/06* (2013.01); *G01J 1/0214* (2013.01); *G01J 1/0411* (2013.01);
(Continued)

(58) Field of Classification Search
CPC ........................................................ G01J 1/06
See application file for complete search history.

(56) References Cited

U.S. PATENT DOCUMENTS

| 4,391,678 A | 7/1983 | Freeman |
| 5,298,752 A * | 3/1994 | Wight ............... G01J 5/06 250/352 |

(Continued)

OTHER PUBLICATIONS

Wikipedia: Negative luminescence; website: https://en.wikipedia.org/wiki/Negative_luminescence; Accessed Aug. 31, 2015; 2 pages.

(Continued)

*Primary Examiner* — David Porta
*Assistant Examiner* — Hugh H Maupin
(74) *Attorney, Agent, or Firm* — Snell & Wilmer L.L.P.

(57) ABSTRACT

An infrared detector system is provided for detecting infrared radiation from an infrared radiation source or a scene. The system includes a first area that is semiconductor-based and biased to produce negative luminescence, the first area including at least one semiconductor-based detector. The detector system further includes at least one additional area being semiconductor-based and biased to produce negative luminescence. A low-emissivity specular retro-reflector shield is configured to reflect infrared radiation and covers the first area and the at least one additional area. The shield defines an aperture to allow the at least one semiconductor-based detector to receive incident rays of the infrared radiation from the infrared radiation source or the scene via a low-scatter, low-emission optical system such that the radiation incident from the infrared radiation source or scene substantially fills the solid angle defined by the aperture at any point in the first area.

22 Claims, 8 Drawing Sheets

(51) Int. Cl.
G01J 5/06 (2006.01)
G01J 1/42 (2006.01)
G01J 1/02 (2006.01)
G01J 5/08 (2006.01)

(52) U.S. Cl.
CPC .............. *G01J 1/4228* (2013.01); *G01J 5/06* (2013.01); *G01J 5/0806* (2013.01)

(56) References Cited

U.S. PATENT DOCUMENTS

| | | | |
|---|---|---|---|
| 6,091,069 | A | 7/2000 | Ashley et al. |
| 6,359,283 | B1 * | 3/2002 | Gordon ............... H01L 27/1462 250/370.08 |
| 7,473,896 | B2 | 1/2009 | Tennant |
| 2007/0290132 | A1 * | 12/2007 | Tennant ............ H01L 27/14627 250/338.4 |

OTHER PUBLICATIONS

IHS Engineering360; Biljana Tadic-Galeb; The Dewar, Cold Stop, and Cold Shield; Website: http://www.globalspec.com/reference/72511/203279/the-dewar-cold-stop-and-cold-shield; Accesses Aug. 31, 2015; 2 pages.

IHS Engineering360; Biljana Tadic-Galeb; Cold Stop Efficiency; Website: http://www.globalspec.com/reference/72512/203279/cold-stop-efficiency; Accessed Aug. 31, 2015; 2 pages.

Max J. Riedl; Optical Design Fundamentals for Infrared Systems; $2^{nd}$ edition; Chapter 7, Section 7.7 Cold Stop and Cold Cold; 2 pages.

SPIE; Anthony S. Lau; The Narcissus Effect in Infrared Optical Scanning Systems; Website: http://spie.org/Publications/Proceedings/Paper/10.1117/12.964596; Accessed Aug. 31, 2015; 1 page.

Zemax; Zemax Narcissus Analysis Macro; Website: https://www.zemax.com/support/knowledgebase/zemax-narcissus-analysis-macro; Accessed Aug. 31, 2015; 10 pages.

* cited by examiner

DETECTOR SYSTEMS HAVING STRAY LIGHT SUPPRESSION USING A RETRO-REFLECTOR SHIELD AND NEGATIVE LUMINESCENCE

BACKGROUND

Field

The present disclosure relates to detector systems, and more particularly, to detector systems having stray light suppression.

Description of the Related Art

Detector systems are utilized in a variety of imaging or thermal detection applications to detect infrared radiation. For example, the detectors may be in form of pixel arrays that register incident infrared radiation received from a radiation source or a scene. An integrated circuit generates a signal based on the incident infrared radiation. Background noise in the form of, for example, shot noise generated by unwanted or stray thermal radiation from any emissive structure lying outside the solid angle of incident source or scene radiation from the optics can undesirably reduce the signal-to-noise ratio. Prior art devices have used cooled baffles or similar structures to reduce such unwanted thermal radiation. However, these baffles add to the size, weight, and power-and cost (SWaP-C) of the detector system. It is desirable to reduce or eliminate the SWAP-C associated with bulky, cooled, expensive radiation shields. Moreover, cooling systems can cause vibration-induced deflections, thus further increasing noise beyond that induced by the stray radiation. Moreover, for uncooled detectors, a cooled baffle defeats the simplicity and low cost of the detector itself. Furthermore, cooling in itself may not sufficiently reduce background radiation induced noise.

Therefore, there is a need in the art for a compact detector system that suppresses stray or unwanted radiation. Furthermore, there is a need in the art for a detector system that can be easily manufactured and/or added on an existing system without a cost-prohibitive process.

SUMMARY

According to an aspect of the invention, an infrared detector system is provided for detecting infrared radiation from at least one of an infrared radiation source or a scene via a low-scatter, low-emission optical device. The detector system includes a first area positioned substantially along a first plane, the first area being semiconductor-based and biased to produce negative luminescence. The first area includes at least one semiconductor-based detector configured to detect the infrared radiation from the infrared radiation source or the scene. The detector system includes at least one additional area being semiconductor-based and biased to produce negative luminescence.

The detector system further includes a low-emissivity specular retro-reflector shield configured to reflect infrared radiation. The retro-reflector shield covers the first area and the at least one additional area, and defines an aperture to allow the at least one detector to receive incident rays of the infrared radiation from the infrared radiation source or the scene via a low-scatter, low-emission optical system such that the radiation incident from the infrared radiation source or scene substantially fills the solid angle defined by the aperture at any point in the first area.

Radiation incident on the first area includes the infrared radiation from the infrared radiation source or the scene, radiation emitted from a portion of the first area and the at least one additional area reduced by negative luminescence and reflected by the specular retro-reflector shield onto the first area, a portion of radiation emitted or scattered from the low-scatter, low-emission optical system, and a portion of radiation emitted by the low-emissivity specular retro-reflector shield.

In a preferred embodiment, the specular retro-reflector shield is a low-emission hemispherical retro-reflective surface having a base positioned substantially along the first plane. The center of the base of the low-emission hemispherical retro-reflective surface is positioned within the first area. The aperture allows the at least one detector to receive incident rays of the infrared radiation from the infrared radiation source or the scene.

The hemispherical retro-reflective surface is a special case of a hemi-ellipsoidal reflective surface having more than one focus. According to an alternative aspect of the invention, the retro-reflector shield may have a hemi-ellipsoidal shape with at least a first focus (or a focal point) positioned within the first area and a second focus (or a focal point) positioned within the at least one additional area.

According to an alternative aspect of the invention, the specular retro-reflector shield is a low-emission curved mirror in the form of a portion of a rotated conic section, including a hemisphere, a hemi-ellipsoid, or a parabolic surface, or a combination of one or more of the hemisphere, hemi-ellipsoid, or the parabolic surface. The low-emission curved mirror has at least one focus positioned within the first area wherein the first plane of the first area contains a base portion of the specular retro-reflector shield.

In more general terms, an advantageous aspect of the invention is that infrared radiation is incident through the optical system within a solid angle into at least a portion of the negative luminescence area that includes at least one infrared detector. A retro-reflector shield is configured to reflect substantially all light originating from outside the negative luminescence area and outside the solid angle of the optical system to regions that do not include the at least one infrared detector. The retro-reflector shield and negative luminescence effect collectively enhance a signal-to-noise ratio in infrared detection.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. The first digit of each reference number generally indicates the figure in which the element appears. The right-most two digits that are common in different drawings relate to elements having certain similar characteristics.

DETAILED DESCRIPTION

Figure 1:
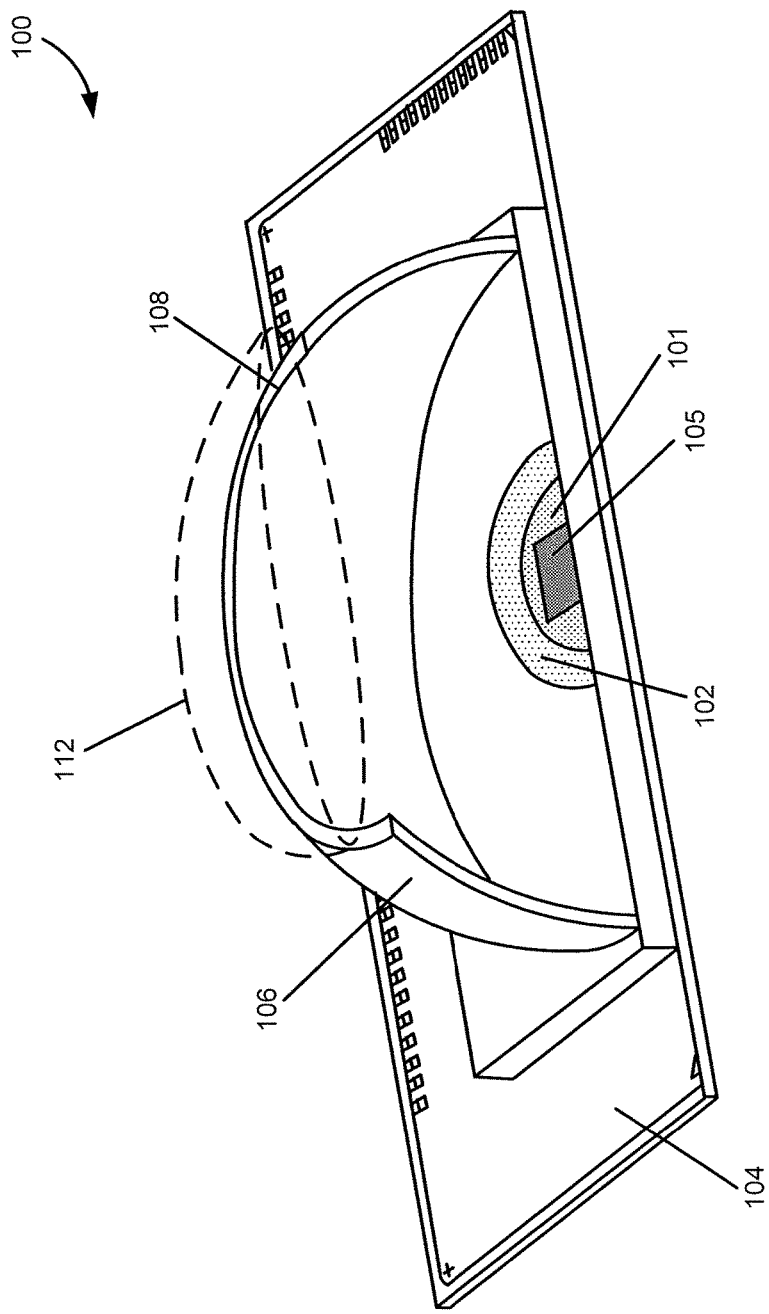
FIG. 1 is a notional cutaway perspective view of an infrared detector system having a hemispherical retro-reflector shield, according to an embodiment of the present invention.

FIG. 1 is a notional cutaway perspective view of an infrared detector system, according to an embodiment of the present invention. The detector system detects infrared radiation from at least one of an infrared radiation source or a scene of interest ("scene") which may be proximate to the optical system or at a longer distance from the optical system. The radiation from the source or scene is detected via a low-scatter, low-emission optical device 112 ("optical device"). The optical device 112 directs light from the radiation source or scene to at least one detector 105. Although a simple refractive lens is shown for illustration of an example, one of skill in the art would appreciate that any combination of refractive or reflective elements can be utilized in the optical device 112. The "low-scatter" preference for the optical device refers to having no or minimal light scattered from surface irregularities or reflected by an imperfect coating from regions other than the infrared radiation source or the scene.

Figure 2:
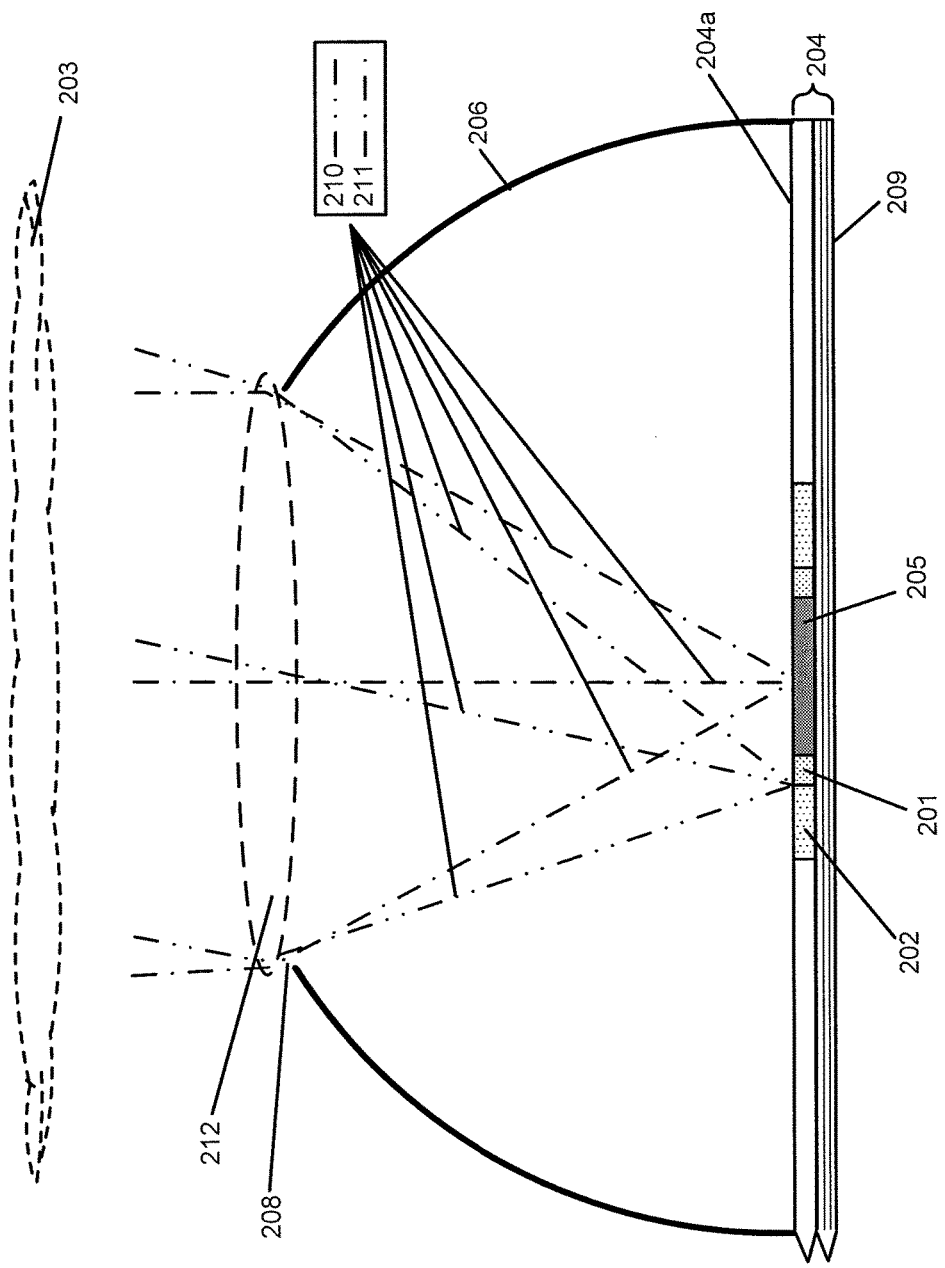
FIG. 2 is a schematic cross-sectional view of an infrared detector system having a hemispherical retro-reflector shield, showing certain representative central and extreme incident rays from a radiation source or a scene, according to an embodiment of the present invention.

The infrared detector system includes a first area 101 positioned substantially along a first plane (corresponding to first plane 204a shown in FIG. 2). The first area 101 is semiconductor-based. The first area 101 includes at least one semiconductor-based detector 105 ("at least one detector") configured to detect the infrared radiation from the infrared radiation source or the scene. The at least one detector 105 may be an array of detectors incorporated in a photodiode thermal sensing pixel array. The mounting structure 104 contains electronics and a readout integrated circuit connected to the at least one detector for generating at least one signal based on the detected infrared radiation.

The first area 101 is biased such that its radiation is substantially reduced by negative luminescence. Negative luminescence is the reduction of equilibrium thermal radiation in an energy range above the semiconductor bandgap. In an embodiment, negative luminesce is achieved by reverse-biasing diodes positioned within the first area 101 (including but not necessarily limited to the at least one detector 105).

The reverse-biased diodes have reduced minority carriers that would otherwise recombine and generate thermal radiation. The infrared detector system includes at least one additional area 102 that is semiconductor-based and biased to produce negative luminescence. The at least one additional area 102 may be positioned along the same plane ("first plane") along which the first area 101 is positioned.

The infrared detector system includes a low-emissivity specular retro-reflector shield 106 ("retro-reflector shield"). The retro-reflector shield 106 is configured to reflect infrared radiation. The low-emissivity and specular surface of retro-reflector shield 106 faces the first area 101 and the at least one additional area 102. Normally the shield volume above the plane 204a (in FIG. 2) is evacuated or filled with air or a non-absorbing gas; however, the shield volume may be filled or partially filled with a transparent, low-emissivity, low-scatter dielectric material which would be included in the design of the optical device.

In the embodiment shown in FIG. 1, the retro-reflector shield 106 is a hemispherical retro-reflective surface having a base positioned substantially along the first plane (the plane along which the first area 101 is positioned). The center of the hemispherical retro-reflective surface is positioned within the first area 101. The retro-reflector shield 106 may be made with one or more of a coated plastic, a micro-machined aluminum, and/or various other materials. The retro-reflector shield 106 may be 3D printed using stereolithography. Radiation from the retro-reflector shield 106 can be minimized by utilizing a low emissivity part. In one embodiment, at least the inner surface of the retro-reflector shield 106 is made of a shiny material (such as shiny gold) for reducing emission of thermal radiation.

The retro-reflector shield 106 defines an aperture 108 to allow the at least one detector 105 to receive incident rays of the infrared radiation from the infrared radiation source or the scene via the optical device 112 such that the radiation incident from the infrared radiation source or scene substantially fills the solid angle defined by the aperture at any point in the first area 101.

As set forth in further details below, the structure and dimensions of the infrared detector system can be designed such that radiation incident on the first area 101 (which includes the at least one detector 105) does not include a significant amount of radiation emitted from areas of the infrared detector system that do not emit radiation not significantly reduced by negative luminescence. More particularly, radiation incident on the first area 101 may include (a) the infrared radiation from the infrared radiation source or the scene, (b) radiation emitted from a portion of the first area 101 and the at least one additional area 102 reduced by negative luminescence and reflected by the retro-reflector shield 106 onto the first area 101, (c) a portion of radiation emitted or scattered from the optical device 112, and (d) a portion of radiation emitted by the retro-reflector shield 116. Radiation incident on the at least one additional area 102 includes (a) the infrared radiation from the infrared radiation source or the scene, (b) radiation emitted from a portion of the first area 101 and the at least one additional area 102 reduced by negative luminescence and reflected by the retro-reflector shield 106, (c) a portion of radiation emitted or scattered from the optical device 112, (d) a portion of radiation emitted by the retro-reflector shield 106, and (e) a portion of radiation emitted from other parts of the detector system either directly within line of sight or reflected by the retro-reflector shield 106.

In an alternative embodiment, additional detectors can be positioned within the at least one additional area 102. The detectors in the at least one additional area 102 may have worse performance (e.g., in terms of signal-to-noise ratio) or be less sensitive than the at least one detector 105 of the first area 101. The performance may be worse because unlike the at least one detector 105, the detectors in the at least one additional area 102 may be exposed to some unwanted radiation from other parts of the infrared detector system which emit radiation that is not reduced by negative luminescence.

In more general terms, an advantageous aspect of the invention is that infrared radiation is incident through the optical system within a solid angle into at least a portion of a negative luminescence area that includes at least one infrared detector. A retro-reflector shield is configured to reflect substantially all light originating from outside the negative luminescence area and outside the solid angle of the optical system to regions that do not include the at least one infrared detector. The retro-reflector shield and negative luminescence effect collectively enhance a signal-to-noise ratio in thermal detection or imaging by the at least one detector.

Due to the negative luminescence effect, the invention can be implemented even in uncooled photodiode thermal sensing arrays. The detector system provides significant cost reduction because the detector system enhances signal-to-noise ratio and suppresses stray radiation without the need for cooling. Alternatively, at least parts of the optical device, specular retro-reflector shield, and the detector system are cooled to further suppress thermal radiation emitted from the other parts of the detector system to further reduce thermal radiation.

FIG. 2 is a schematic cross-sectional view of an infrared detector system having a hemispherical retro-reflector shield 206. FIG. 2 shows that the dimensions and structure of the invention can be designed such that all or substantially all rays from the infrared radiation source or the scene 203 are incident on the first area 201. The representative central rays 211 reaching the center of the first area 201 and representative extreme rays 210 incident on the left border of the first area 201 are shown. The at least one detector 205, the first area 201, and the at least one additional area 202 are positioned substantially along a first plane 204a. The optical device 212 directs the representative central and extreme rays 211/210 from the infrared radiation source or scene 203 to the at least one detector 205, thereby filling the solid angle of the aperture 208 as measured from any point in the first area 201. The mounting structure 204 contains readout integrated circuit and electronics 209 that will generate a signal based on, for example, photo current or voltage detected by the at least one detector 205. In FIG. 2, the at least one additional area 202 is assumed to be in the same plane as the first area 201. However, in other embodiments, the at least one additional area need not be in the same plane as the first area.

Figure 3:
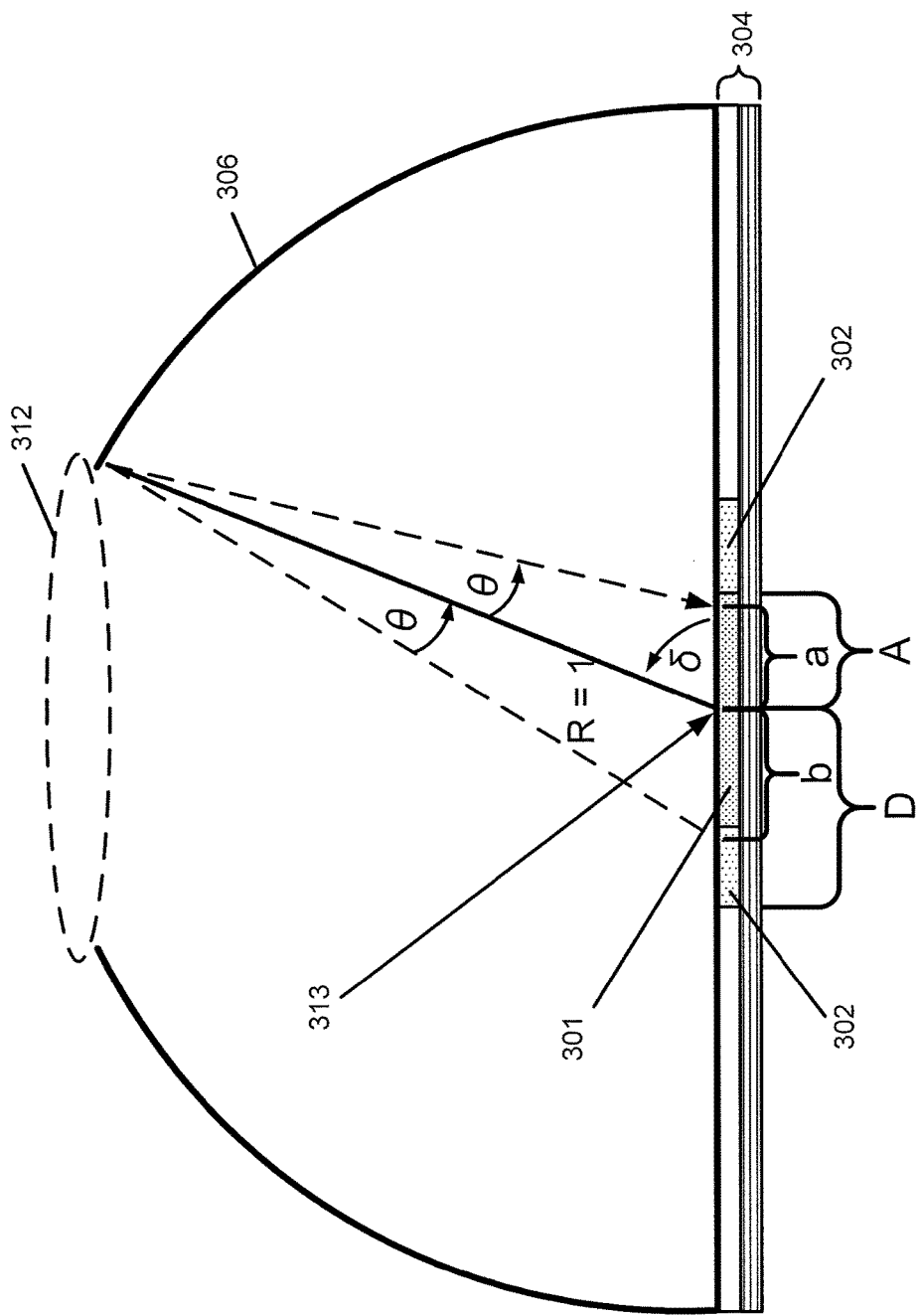
FIG. 3 is a schematic cross-sectional view of an infrared detector system having a hemispherical retro-reflector shield, demonstrating that all rays incident on a first area that are not received from an optical device originate in the first area or at least one additional area which are suppressed by negative luminescence, according to an embodiment of the present invention.

FIG. 3 is a schematic cross-sectional view of a hemispherical infrared detector system, demonstrating that all or substantially all rays incident on the first area 301 that are not received from the optical device 312 originate in the first area 301 or the at least one additional area 302 which are suppressed by negative luminescence. In FIG. 3, the at least one additional area 302 is assumed to be in the same plane as the first area 301.

All distances are normalized to radius (R=1) of the retro-reflector shield 306. "a" is the distance in the plane to the right of the center 313 of the retro-reflector shield 306 on which a ray impinges when that ray emerged from a distance "b" in the plane to the left of the center of the retro-reflector shield 306. The following analysis assumes that there is negligible emission from the retro-reflector shield 306. The following analysis also ignores light detected from the radiation source or the scene through the optical device 312. Since all rays move in planes containing the ray direction and line segment between the center 313 and point of origin and thus return to the same line segment after reflecting, it is sufficient to consider a single representative plane. Any ray impinging on "a" comes from distance "b" related to "a" by the magnitude of "a" and the cosine of the angle δ.

$$\frac{a \sin \delta}{1 - a \cos \delta} = \tan\theta = \frac{b \sin \delta}{1 + b \cos \delta} \text{ implies}$$

$$a = \frac{b}{1 + 2b \cos \delta},$$

and $$b = \frac{a}{1 - 2a \cos \delta}.$$

From a distance from the origin in the plane A≤⅓, there is a distance from the origin D≤1 such that all energy incident within a radius not greater than A must originate from the plane within an area not greater than radius D, where D=A/(1−2A), under the assumption of negligible scattered or emitted radiation from the optical device, or the retro-reflector.

This can be ascertained by noting that the derivative $$\frac{\partial b}{\partial a} = \frac{2}{(1 - 2a \cos \delta)^2}$$

increases with increasing a for 0≤a≤1, and decreases with increasing δ for 0≤δ≤π/2. Thus $b_{max}$, the maximum value of b for a given value of a, occurs at δ=0 where $b_{max}$=a/(1−2a), which increases with increasing a up to a=⅓. Thus, if D is defined as A/(1−2A) then $b_{max}$≤D≤1 for any a≤A≤⅓, and all radiation impinging on points within an area not greater than radius A, must originate within the area not greater than radius D. As such, the first area 301 is defined as the area not greater than radius A. The at least one additional area 302 is defined as being the area not greater than radius D, but not as small as radius A.

In one embodiment, the maximum radius size for the first area is not greater than ⅓ of the radius of the hemisphere. For example, the radius size (A) of the first area 301 can be designed to be around ⅕ of the radius of the hemisphere, in which case the outer radius of the at least one additional area (D) would be ⅓. The smaller the fraction of the radius of the retro-reflector shield 306, the smaller will be the area of the at least one additional area 302 required to ensure that radiation from only negative luminescence areas is received by the first area 301.

Although it is desirable for A to be less than or equal to ⅓, it is possible for A to be greater ⅓. However, when A>⅓, some rays bounce off the retro-reflector shield 306 twice, and the first area 301 and the at least one additional area 302 must cover the plane of the hemisphere as it must if A=⅓.

As shown by the analysis above with respect to FIG. 3, essentially all radiation incident within the first area 301 defined by radius A comes from the infrared radiation source or the proximate scene through the optical device 312, since the radiative background is suppressed by negative luminescence of the first area 301 and the at least one additional area 302 (having outer radius D).

Figure 4:
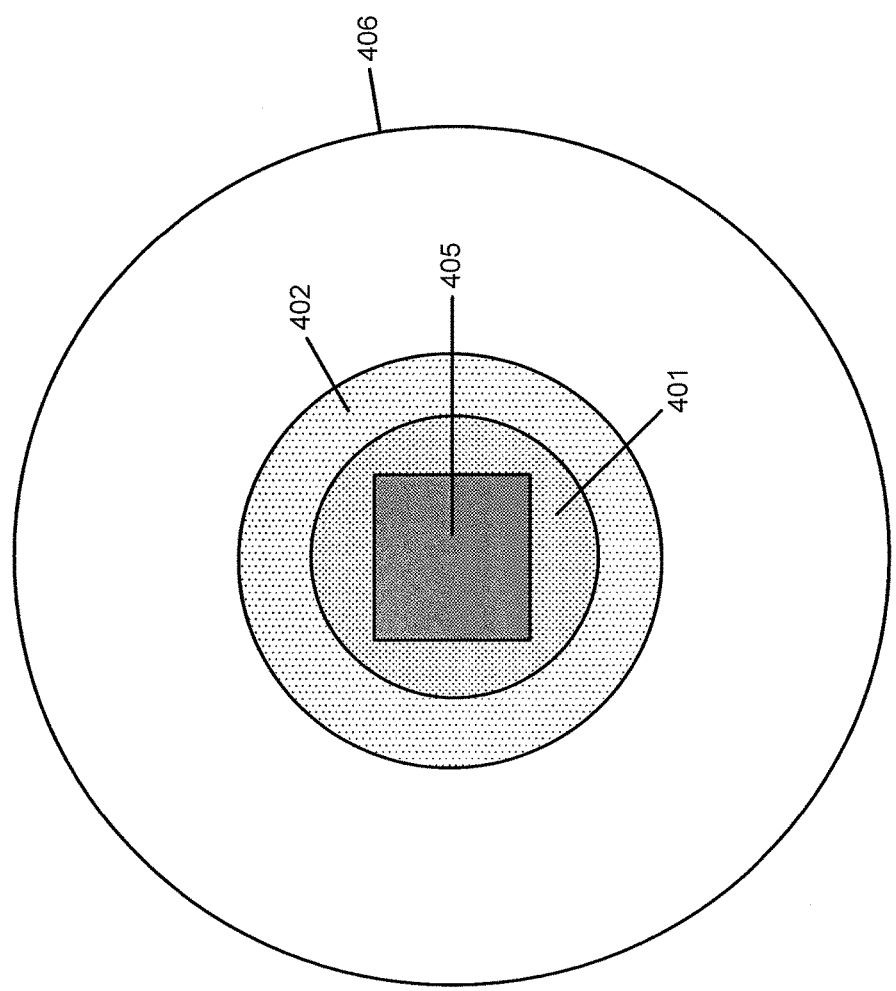
FIG. 4 is a schematic top view of an infrared detector system having a hemispherical retro-reflector shield, according to an embodiment of the present invention.

FIG. 4 is a schematic top view of the infrared detector system. The base perimeter of the retro-reflector shield is denoted by numeral 406. FIG. 4 further shows top views of the at least one detector 405, the first area 401, and the at least one additional area 402.

Figure 5A:
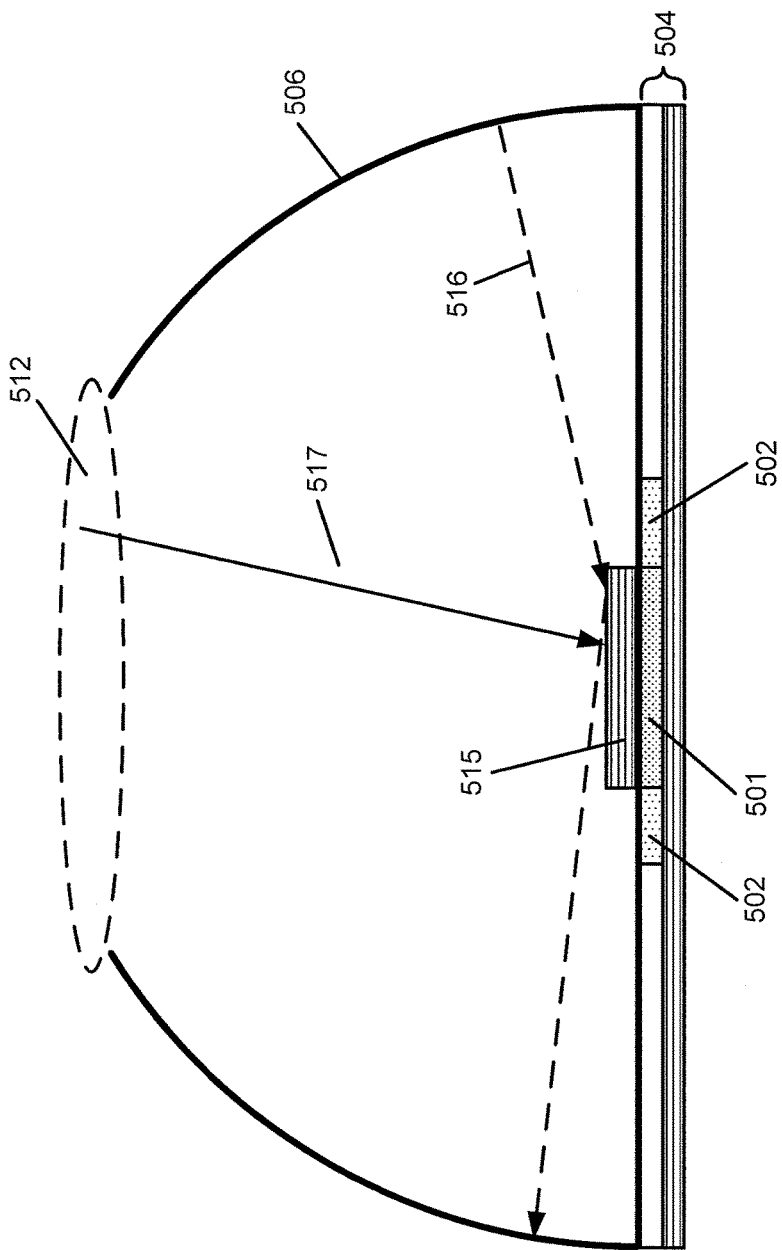
FIG. 5A is a schematic cross-sectional view of an infrared detector system wherein an edge filter coating is added for suppressing stray off-normal angle/near grazing radiation, according to an alternative embodiment of the invention.
Figure 5B:
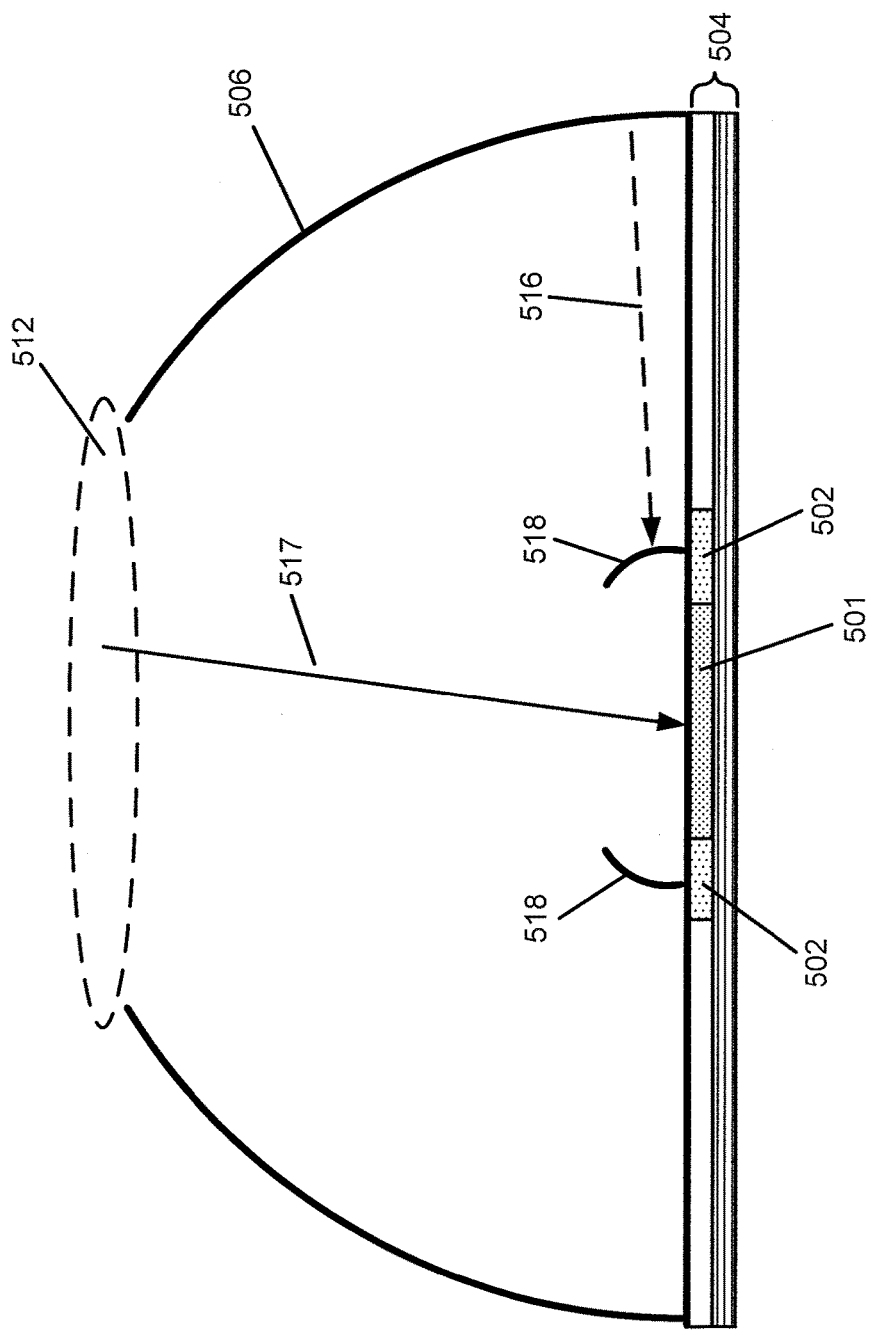
FIG. 5B is a schematic cross-sectional view of an infrared detector system wherein a curved inner low-emissivity specular reflector shield is added for suppressing stray off-normal angle/near grazing radiation, according to an alternative embodiment of the invention.

FIGS. 5A and 5B illustrate alternative embodiments of the invention wherein additional elements are utilized to suppress unwanted high off-normal angle or near grazing incidence on the first area 501. FIG. 5A shows a detector system according to an alternative embodiment of the invention wherein an edge filter coating 515 is added on the first area 501 for suppressing stray off-normal angle/near grazing radiation (as shown, for example, by representative ray 516). The edge filter coating 515 may serve as a short-wavelength-pass interference filter for reflecting light at an angle of incidence that is greater than a threshold angle at wavelengths characteristic of thermal radiation incident on the first area 501 and detectable by the at least one detector 505. Even scattered or small amounts of emitted light from high off-normal angles are reflected by the edge filter coating 515. The edge filter coating 515 allows the light from the infrared radiation source/scene entering closer to the normal angle (as shown, for example, by representative ray 517) to come through readily in order to reach the first area 501. One of ordinary skill in the filter art would appreciate that a "quarter-wave stack" may have the attributes of this type of interference filter.

Alternatively, high off-normal angle rays can be suppressed using an inner low-emissivity specular reflector shield 518 ("inner shield") as shown in FIG. 5B. The inner shield 518 is positioned to reduce the size of the at least one additional area 502 required to prevent at least some radiation from other parts of the detector system from reaching the first area 501. The inner shield 518 has an aperture that has a substantially smaller area than the area of the aperture of the retro-reflector shield 506 and arranged so as not to block the infrared radiation from the infrared radiation source or the scene onto the first area 501. The dimensions and positioning of the inner shield 518 can be optimized using ray-tracing analysis with known ray-tracing software.

The inner shield 518 can be made of a hemispherical shape that helps keep low angle views directed onto the first area 501. It is preferable for the center of curvature of the retro-reflector shield 506 and the inner shield 518 to be substantially the same. The inner surface of the inner shield 518 is a low-emission specular surface. The outer surface of the inner shield 518 may be a low-emission specular surface. Thermal radiation from the inner shield 518 itself can be further suppressed by (a) cooling the inner shield 518 or its surroundings in which case the outer surface of the inner shield may be absorbing, (b) coating the inner shield 518 with a highly reflective material, and/or (c) biasing an inner shield 518 made of a semiconductor based material to reduce its radiation by negative luminescence.

The embodiments shown in FIGS. 5A and 5B are less susceptible to noise created from near-grazing or off-normal angle incident light as compared with embodiments that do not utilize such features.

Figure 6:
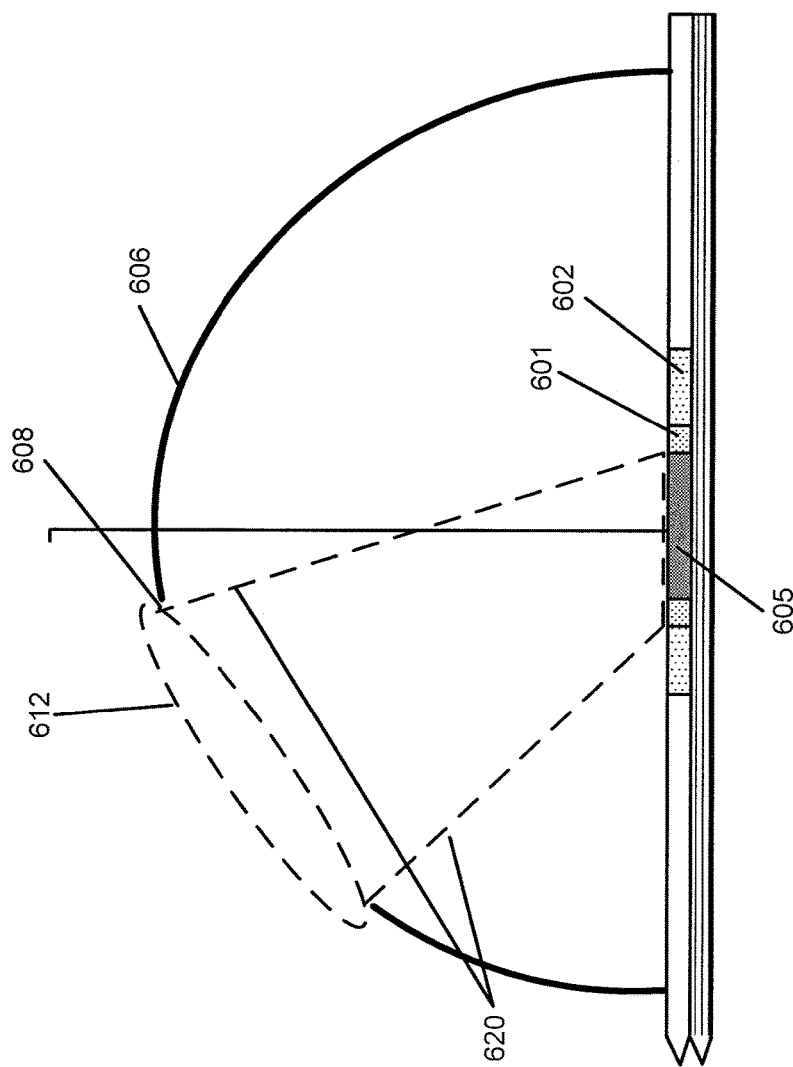
FIG. 6 is a schematic cross-sectional view of a detector system having a hemispherical retro-reflector shield with an off-axis positioned optical device, according to an alternative embodiment of the invention.

FIGS. 1-5B show centrally positioned optics (positioned along a central axis normal to the first plane and passing through the center of the hemispherical surface). FIG. 6 shows an alternative embodiment of the invention in which the optical axis is tilted, if the application requires off-axis radiation detection. In other words, the aperture 608 and the optical device 612 are positioned off-axis. Scope of representative rays incident on the first area 601 from the radiation source or scene is denoted by 620.

Figure 7:
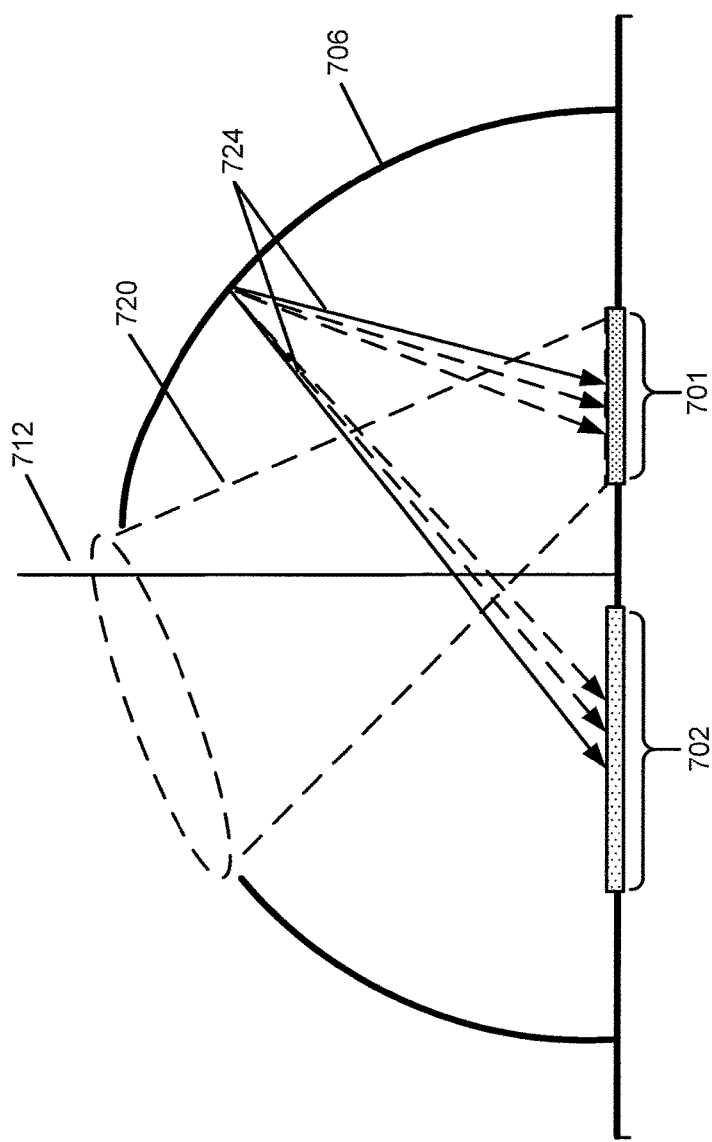
FIG. 7 is a schematic cross-sectional view of a hemi-ellipsoidal retro-reflector shield with off-axis illumination from an imaging optical device, according to an alternative embodiment of the invention.

The present invention is not limited to hemispherical retro-reflector shields with a single focus. Hemispherical retro-reflector shields are a special case of hemi-ellipsoidal structures which can have more than one focus. FIG. 7 shows a hemi-ellipsoid reflector 706 with off-axis illumination from optical device 712. The hemi-ellipsoid structure has two foci, which allows separation of the first area 701 and the at least one additional area 702. The radiation from the scene or the infrared radiation source is incident on the first area 701 via the off-axis imaging optical device 712. The pairs of arrows 714 show representative reflections between the first area 701 and the at least one additional area 702.

In alternative embodiments, the specular retro-reflector shield can be a low-emission curved mirror in the form of a portion of a rotated conic section, including a hemisphere, a hemi-ellipsoid, or a parabolic surface, or a combination of one or more of the hemisphere, hemi-ellipsoid, or the parabolic surface. The low-emission curved mirror has at least one focus positioned within the first area wherein the plane of the first area contains a base portion of the specular retro-reflector shield. The alternative reflector embodiments require ray-tracing analysis using known ray-tracing software for optimization.

Instead of or in addition to utilizing smooth retro-reflective surfaces for the retro-reflector shields discussed above, retro-reflective corner cube structures can be utilized. The retro-reflecting corner cube surfaces cover the facets of a hollow partial polyhedron placed over the first area and the at least one additional area except for a portion of the first area that is positioned to receive the infrared radiation from the infrared radiation source or the proximate scene. The specular retro-reflecting corner cube surfaces are arranged to return to the first area substantially only light emitted or reflected from the first area and a part of the at least one additional area and not from any other region within the specular retro-reflector shield. The retro-reflector shield may include corner reflectors populating the facets of halved polyhedra such as an octahedron or an icosahedron. The retro-reflector shield may include corner reflectors populating the facets of any convex polyhedral structure whose facets are either equilateral triangles or hexagons or a mix thereof. The structure/configuration of retro-reflective surfaces can be optimized using ray-trace analysis with known ray tracing software.

Although image detection with respect to infrared radiation is discussed above, it can be appreciated by a person of ordinary skill that the detector system can be utilized to detect other types or wavelengths of radiation. Exemplary implementations of the disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such implementations that reasonably fall within the scope of the advancement to the art hereby contributed, and that scope shall not be restricted, except in light of the appended claims and their equivalents.

The invention claimed is:

1. A detector system for detecting infrared radiation from at least one of an infrared radiation source or scene via a low-scatter, low-emission optical device, the detector system comprising:

a first area having at least one semiconductor-based detector configured to detect the infrared radiation from the infrared radiation source or scene;

a second area that is contiguous with and includes the first area having the at least one semiconductor-based detector, where the second area, the first area and the at least one semiconductor-based detector are positioned along a first plane, semiconductor-based and biased to produce negative luminescence; and a low-emissivity specular retro-reflector shield covering the first area and the second area, the low-emissivity specular retro-reflector shield defining an aperture that allows incident rays from the infrared radiation source or scene to pass through via the low-scatter, low-emission optical device to the at least one semiconductor-based detector that receives the incident rays such that radiation incident from the infrared radiation source or scene substantially fills a solid angle defined by the aperture at any point in the first area, wherein radiation incident on the first area includes the infrared radiation from the infrared radiation source or scene, radiation emitted from a portion of the first area and the second area reduced by negative luminescence and reflected by the low-emissivity specular retro-reflector shield onto the first area, a portion of radiation emitted or scattered from the low-scatter, low-emission optical device, and a portion of radiation emitted by the low-emissivity specular retro-reflector shield.

2. The detector system of claim 1, wherein at least parts of the low-scatter, low-emission optical device, low-emissivity specular retro-reflector shield, and the detector system are cooled to further suppress thermal radiation emitted from other parts of the detector system.

3. The detector system of claim 1, wherein the low-emissivity specular retro-reflector shield is a low-emission hemispherical retro-reflective surface having a base positioned substantially along the first plane, a center of the base of the low-emission hemispherical retro-reflective surface being positioned within the first area.

4. The detector system of claim 1, wherein the second area includes at least another semiconductor-based detector for detecting the infrared radiation from the infrared radiation source or scene.

5. The detector system of claim 1, wherein the low-emissivity specular retro-reflector shield is a low-emission curved mirror in a form of a portion of a rotated conic section, including a hemisphere, a hemi-ellipsoid, or a parabolic surface, or a combination of one or more of the hemisphere, hemi-ellipsoid, or the parabolic surface, the low-emission curved mirror having at least one focus positioned within the first area, wherein the first plane of the first area contains a base portion of the low-emissivity specular retro-reflector shield.

6. The detector system of claim 1, further comprising a curved inner low-emissivity specular reflector positioned to reduce a size of the second area required to prevent at least some radiation from other parts of the detector system from reaching the first area, wherein the curved inner low-emissivity specular reflector has an aperture that has a substantially smaller area than an area of the aperture of the low-emissivity specular retro reflector shield and arranged so as not to block the infrared radiation from the infrared radiation source or scene onto the at least one semiconductor-based detector in the first area.

7. The detector system of claim 6, wherein the curved inner low-emissivity specular reflector is at least one of cooled to reduce thermal radiation, made of a specular retro-reflective surface, or biased to produce negative luminescence, in order to suppress thermal radiation, the curved inner low-emissivity specular reflector is configured to prevent at least some radiation from other parts of the detector system from reaching the first area.

8. The detector system of claim 1, further comprising a short-wavelength-pass interference filter positioned proximate to the first area for suppressing stray radiation, reflecting light at an angle of incidence that is greater than a threshold angle at wavelengths characteristic of thermal radiation incident on the first area and detectable by the at least one semiconductor-based detector.

9. The detector system of claim 1, wherein the low-emissivity specular retro-reflector shield is configured to control stray radiation by returning incoming stray radiation to points outside of the first area, thereby enhancing thermal detection or imaging by the at least one semiconductor-based detector.

10. The detector system of claim 1, wherein the at least one semiconductor-based detector includes at least one reverse-biased photo diode configured to produce negative luminescence.

11. The detector system of claim 1, wherein the low-emissivity specular retro-reflector shield includes a plurality of specular retro-reflecting corner cube surfaces covering facets of a partial polyhedron positioned over and at a distance from the first area and the second area except for a portion of the first area that is positioned to receive the infrared radiation from the infrared radiation source or scene, and wherein the plurality of specular retro-reflecting corner cube surfaces are arranged to return to the first area substantially only light emitted or reflected from the first area and a part of the second area and not from any other region within the low-emissivity specular retro-reflector shield.

12. The detector system of claim 1, wherein the at least one semiconductor-based detector is an array of detectors incorporated in a photodiode thermal sensing pixel array.

13. The detector system of claim 1, wherein the detector system is cooled to further reduce thermal radiation from the first area and the second area.

14. The detector system of claim 1, further comprising an electronic circuit connected to the at least one semiconductor-based detector for generating at least one signal based on the detected infrared radiation.

15. The detector system of claim 1, wherein the aperture is positioned along a tilted axis that makes an angle with an axis normal to a base of the low-emissivity specular retro-reflector shield.

16. A detector system for detecting infrared radiation from at least one of an infrared radiation source or scene via a low-scatter, low-emission optical device, the detector system comprising:

a first area having at least one semiconductor-based detector configured to detect the infrared radiation from the infrared radiation source or scene;

a second area that is contiguous with and includes the first area having the at least one semiconductor-based detector, where the second area, the first area and the at least one semiconductor-based detector are positioned along a first plane, semiconductor-based and biased to produce negative luminescence;

a low-emissivity specular hemispherical retro-reflector shield covering the first area and the second area, the low-emissivity specular hemispherical retro-reflector shield having a base positioned substantially along the first plane, a center of the base of the low-emissivity specular hemispherical retro-reflective shield being positioned within the first area, the low-emissivity specular hemispherical retro-reflector shield defining an aperture that allows incident rays from the infrared radiation source or scene to pass through via the low-scatter, low-emission optical device to the at least one semiconductor-based detector that receives the incident rays such that radiation incident from the infrared radiation source or scene substantially fills a solid angle defined by the aperture at any point in the first area, wherein radiation incident on the first area includes the infrared radiation from the infrared radiation source or scene, radiation emitted from a portion of the first area and the second area reduced by negative luminescence and reflected by the low-emissivity specular hemispherical retro-reflector shield onto the first area, a portion of radiation emitted or scattered from the low-scatter, low-emission optical device, and a portion of radiation emitted by the low-emissivity specular hemispherical retro-reflector shield.

17. The detector system of claim 16, wherein the first area is defined by a first disc with a first radius, A, from the center of the base of the low-emissivity specular hemispherical retro-reflective shield of radius R and the second area is defined by a second disc with a second radius, B, from the center of the base of the low-emissivity specular hemispherical retro-reflective shield, where a normalized first radius of the first disc, a, defined as A/R, is equal to $$\frac{b}{1 + 2b\cos\delta}$$

where b is defined as B/R is the normalized second radius of the second disc and δ is an angle between a line from the center of the base of the low-emissivity specular hemispherical retro-reflective shield to a point of reflection on the low-emissivity specular hemispherical retro-reflective shield of a ray incident on a and a line defined by an intersection of a plane of reflection with a plane of the base of the low-emissivity specular hemispherical retro-reflective shield, wherein the normalized first radius, a, is at a minimum when cos δ is equal to 1.

18. The detector system of claim 17, wherein the second area defined by the second disc with the second radius is no greater than one-third a radius of the low-emissivity specular hemispherical retro-reflective shield.

19. The detector system of claim 16, further comprising a short-wavelength-pass interference filter positioned proximate to the first area for suppressing stray radiation, reflecting light at an angle of incidence that is greater than a threshold angle at wavelengths characteristic of thermal radiation incident on the first area and detectable by the at least one semiconductor-based detector.

20. The detector system of claim 16, further comprising an electronic circuit connected to the at least one semiconductor-based detector for generating at least one signal based on the detected infrared radiation.

21. A detector system for detecting infrared radiation from at least one of an infrared radiation source or scene via a low-scatter, low-emission optical device, the detector system comprising:

a first area having at least one semiconductor-based detector configured to detect the infrared radiation from the infrared radiation source or scene;

a second area that is contiguous with and includes the first area having the at least one semiconductor-based detector, where the second area, the first area and the at least one semiconductor-based detector are positioned along a first plane, semiconductor-based and biased to produce negative luminescence; and a low-emissivity specular hemi-ellipsoidal retro-reflector shield covering the first area and the second area, the low-emissivity hemi-ellipsoidal specular retro-reflector shield having at least a first focus positioned within the first area and a second focus positioned within the second area, the low-emissivity specular hemi-ellipsoidal retro-reflector shield having a base positioned substantially along the first plane, the low-emissivity specular hemi-ellipsoidal retro-reflector shield defining an aperture that allows incident rays from the infrared radiation source or scene to pass through via the low-scatter, low-emission optical device to the at least one semiconductor-based detector that receives the incident rays such that radiation incident from the infrared radiation source or scene substantially fills a solid angle defined by the aperture at any point in the first area, wherein radiation incident on the first area includes the infrared radiation from the infrared radiation source or scene, radiation emitted from a portion of the first area and the second area reduced by negative luminescence and reflected by the low-emissivity specular hemi-ellipsoidal retro-reflector shield onto the first area, a portion of radiation emitted or scattered from the low-scatter, low-emission optical device, and a portion of radiation emitted by the low-emissivity specular hemi-ellipsoidal retro-reflector shield.

22. The detector system of claim 21, wherein the low-emissivity specular hemi-ellipsoidal retro-reflector shield includes a plurality of retro-reflecting corner cube surfaces covering the facets of a partial polyhedron positioned over and at a distance from the first area and the second area except for a portion of the first area that is positioned to receive the infrared radiation from the infrared radiation source or scene, and wherein the plurality of retro-reflecting corner cube surfaces are arranged to return to the first area substantially only light emitted or reflected from the first area and a part of the second area and not from any other region within the low-emissivity specular hemi-ellipsoidal retro-reflector shield.

* * * * *